United States Patent
Kloth

(10) Patent No.: US 7,200,107 B2
(45) Date of Patent: Apr. 3, 2007

(54) METHOD AND APPARATUS FOR LOSSLESS SWITCHOVER IN A REDUNDANT SWITCH FABRIC

(75) Inventor: Axel K. Kloth, Mountain View, CA (US)

(73) Assignee: Mindspeed Technologies, Inc., Newport Beach, CA (US)

(*) Notice: Subject to any disclaimer, the term of this patent is extended or adjusted under 35 U.S.C. 154(b) by 1064 days.

(21) Appl. No.: 10/020,481

(22) Filed: Nov. 30, 2001

(65) Prior Publication Data

US 2002/0089926 A1    Jul. 11, 2002

Related U.S. Application Data

(60) Provisional application No. 60/260,115, filed on Jan. 6, 2001.

(51) Int. Cl.
  *H04J 1/16*   (2006.01)
  *H04J 3/14*   (2006.01)
  *H04L 12/28*  (2006.01)
  *H04L 12/56*  (2006.01)

(52) U.S. Cl. .............. 370/220; 370/389; 370/394; 370/395.6

(58) Field of Classification Search ........ 370/217–221, 370/225, 250, 242–245
See application file for complete search history.

(56) References Cited

U.S. PATENT DOCUMENTS

| | | | | |
|---|---|---|---|---|
| 5,189,668 A | * | 2/1993 | Takatori et al. | 370/427 |
| 5,953,314 A | * | 9/1999 | Ganmukhi et al. | 370/220 |
| 6,067,286 A | * | 5/2000 | Jones et al. | 370/218 |
| 6,385,209 B1 | * | 5/2002 | Skirmont et al. | 370/419 |
| 6,487,169 B1 | * | 11/2002 | Tada | 370/219 |
| 6,594,229 B1 | * | 7/2003 | Gregorat | 370/219 |
| 6,594,261 B1 | * | 7/2003 | Boura et al. | 370/389 |
| 6,661,786 B1 | * | 12/2003 | Abbiate et al. | 370/386 |
| 6,667,978 B1 | * | 12/2003 | Delp et al. | 370/395.1 |
| 6,801,525 B1 | * | 10/2004 | Bodnar et al. | 370/352 |
| 6,906,999 B1 | * | 6/2005 | Schulz | 370/218 |

OTHER PUBLICATIONS

Chen, W.-S.E. et al. (Computers and Communications, 1991. Conference Proceedings. Tenth Annual International Phoenix Conference on Mar. 27-30, 1991 pp. 703-709); A high-performance fault-tolerant switching fabric for ATM swithcing systems.*

* cited by examiner

*Primary Examiner*—Huy D. Vu
*Assistant Examiner*—Daniel Ryman

(57) ABSTRACT

Method and apparatus for lossless switchover in a redundant switch fabric improves the reliability and predictability of a cell reaching its destination without the cell being lost during switch-over through redundant switch fabrics. Ingress and egress buffers are disposed in input and output line cards to maintain the history of transmitted cells. When switch-over occurs, the cells transmission history is used to recover lost cells transparently and with minimal latency.

13 Claims, 6 Drawing Sheets

METHOD AND APPARATUS FOR LOSSLESS SWITCHOVER IN A REDUNDANT SWITCH FABRIC

CROSS-REFERENCE TO RELATED APPLICATION

This present application is related to a provisional application Ser. No. 60/260,115 filed on Jan. 6, 2001, entitled "Lossless switchover of switch fabrics with buffers and queues," by Axel K. Kloth, currently pending, for which the priority date for this application is hereby claimed.

BACKGROUND

1. Technical Field

This invention pertains generally to the field of network processing, more particularly to maintaining cell integrity during switch-over between active and redundant switch fabrics planes. This invention further pertains to a method of segmentation and reassembly of packets that are transmitted through switch fabrics that results in high cell integrity.

2. Description of the Prior Art

Packet switching has long been used as an alternative to conventional circuit switches. One reason is because conventional circuit switches are far too expensive for intensive or interactive communications. Packet switching involves the transmission of data packets across a shared network. These data packets are also called datagrams. Data packets are individually addressed so that packet switches can route each packet over the most appropriate and available circuit. This allows each packet to survive independently. Each packet may represent an individual set of data, or a larger set of user data can be fragmented into multiple packets. In either case, data propagates through the network using independent packets.

Because the data packets traverse the network independent of each other, user data packets can arrive out of sequence. This results in random communication errors and the subsequent need for retransmission of lost or corrupted data packets. Packet switched networks exhibit unpredictable and variable delivery times. Because of this, packet switching has traditionally been considered unviable for stream-oriented communications such as real-time voice or video.

In the known art, packet-switched networks perform the process of error detection and correction at each of the packet switches. This improves the integrity of data transmission. These error correction processes demand extensive computational resources, resulting in added cost and complexity in the packet switches. Additionally, the process is time-consuming because each packet must be checked for errors prior to being forwarded to the next node. The time consumed during the error-checking process imposes some level of latency on each packet.

An additional disadvantage in traditional systems is that cells can get lost during switchover if a switch fabric is buffered and queued. Using a non-buffered switch fabric eliminates this possibility, but a non-buffered switch fabric exhibits lower overall throughput. In the basic buffered and queued switch fabric, switchover will not be lossless. All cells in the active switch fabric will have to be discarded once it transitions to an inactive state. The cells in the standby switch fabric will have to be discarded, too, since it cannot be guaranteed that both planes of the switch fabric operate in a synchronous manner at the micro-cycle level. Therefore, arrival of fragmented and otherwise invalid cells is very likely. These errors can be detected and corrected in higher layers of the network protocol; so lost cells don't pose much of a problem to data communications integrity. In telecommunication systems, however, the situation is different. Here time division multiplexed (TDM) traffic is predominant, and there is no higher layer function verifying this traffic in a plesiochronous digital hierarchy (PDA). This can become especially critical if system signaling, such as ISDN/ISUP, POTS or CCS#7, is affected.

SUMMARY OF THE INVENTION

What is needed is a means of preventing a cell loss during switch-over in a redundant switch fabrics. This can be accomplished with the maintenance of a cell history on the ingress and egress of the redundant switch fabrics so that lost cells can be identified and then resent immediately. By achieving this objective, the reliability and predictability of packet delivery will be markedly improved.

The present invention prevents cell loss during switch-over from an active switch fabric element to a standby switch fabric element. Prior to the switchover event, the active switch fabric element and the standby switch fabric element are both performing the switching and routing functions necessary to propagate a cell from an input line card to a destination output line card. One object of the present invention is to ensure that during and immediately after the switch-over event, the output line card does not drop any cells.

In one illustrative embodiment of the present invention, a method for preventing cell loss during the switch-over event comprises several steps. The first of these is to receive an inbound cell into the ingress buffer. The ingress buffer may receive the cell from any of a number of physical interfaces. Optionally, the method may also comprise receiving a datagram from a physical interface. The datagram may include more data than a single cell can carry. When this occurs, the method provides for segmenting the datagram into one or more cells. These cells can then be forwarded to the ingress buffer.

In this illustrative embodiment, the purpose of the ingress buffer is to provide a history of the cells that are forwarded to a plurality of switch fabric elements. Additionally, the ingress buffer serves as an elasticity buffer between datagrams or cells arriving at the physical interface and the plurality of switch fabric elements. The cells that are stored in the ingress buffer are then copied and dispatched to a plurality of switch fabric elements. The switch fabric elements each receive a copy of a cell to be routed. The switch fabric elements determine which output port a cell is to be directed to. Each switch fabric element will route its copy of the cell to the appropriate output port as an outbound cell. All switch fabric elements perform the routing in a parallel manner.

Prior to the switch over event, only one of the switch fabric elements will be designated as the active switch fabric element. The cells routed by the active switch fabric element are forwarded to an egress buffer. The method further comprises receipt of a switch-over signal. The switch-over signal comprises the redesignation of the active switch fabric element. The new active switch fabric element is then used as the source of outbound cells that are to be forwarded to the egress buffer. The method of the present invention concludes with dispatching outbound cells from the egress buffer to external interfaces.

Specialized management of the egress buffer further enables arresting cell loss in the method of the present invention. It is best to visualize the management of the egress buffer with respect to two streams of cells. The first stream of cells arrives from the active switch fabric element prior to the switch over event and is stored in the egress buffer. Immediately after the switch over event, the source of cells to be stored in the egress buffer is the stream of cells arriving from the newly designated active switch fabric element.

In this example, the first step in managing the egress buffer is to determine if the two cell streams are synchronized. If the identical cells in the two cell streams had been arriving simultaneously prior to switch-over, there would not be a gap or an overlap in the contents of the egress buffer relative to the formerly active switch fabric element cell stream. In order to determine if the two cell streams are synchronized, the method of the present invention provides for either a bit-by-bit comparison of the cell stream arriving from the newly designated active switch fabric element to cells stored in the egress buffer or by examination of a cell sequence number that can be attached to each cell when they are originally stored in the ingress buffer.

If there is an overlap in the egress buffer, a read pointer for the egress buffer is adjusted to overcome the overlap. If, on the other hand, there's a gap in the egress buffer, the method provides for dispatching the lost cells from the ingress buffer, sending copies of those cells to the switch fabric elements so that they can again be routed and finally storing the cells in the egress buffer. Once the egress buffer is adjusted to accommodate either an overlap or a gap, cells can be dispatched to the output.

In some embodiments, the outbound cells need to be reassembled into datagrams because they collectively form a larger data set. In one example, this is done by selecting outbound cells from the egress buffer and reassembly of the cells into datagrams prior to conveying the datagram to a physical interface. Because cells belonging to different datagrams can arrive out of sequence, the method provides for the creation of storage elements for each datagram that can be concurrently reassembled. A separate storage element is created for each router port and each delivery priority level that must be supported. Outbound cells from the egress buffer are stored in the storage elements according to which datagram the cells belong to, the priority level of the cells and the destination router port that the cell must be delivered to. Once all of the cells pertaining to a datagram are received in the storage element, the datagram is dispatched to a physical interface.

The present invention further comprises a redundant switching system embodying the method described above. The redundant switching system comprises a plurality of switch fabric elements that accept inbound cells and then direct those cells to output ports as outbound cells. The redundant switching system further comprises an input line card, an integrity manager, and an output line card.

In one example embodiment, the input line card comprises an ingress buffer that receives cells that must be directed to a switch fabric element. The input line card also comprises a cell replicator. The cell replicator receives inbound cells from the ingress buffer, creates copies of those cells and then directs those cells to the plurality of switch fabric elements.

In another example embodiment, the input line card may further comprise a physical interface that is used to receive datagrams. Because datagrams can be larger than a cell, a segmentation unit is provided on the input line card to segment the datagrams into one or more cells. The input line card may further comprise a cell manager that takes the output from the segmentation unit and directs them to the ingress buffer. In some embodiments, the ingress buffer comprises additional storage that accepts a cell sequence number that is generated by a cell sequence numbering unit. Cell sequence numbers are used in these alternative embodiments to facilitate the reassembly of datagrams.

The integrity manager monitors the health of the plurality of switch fabric elements. Based on the health of the switch fabric elements, the integrity manager designates one of the switch fabric elements as an active switch fabric. When the integrity manager detects an error in the active switch fabric element, it then designates a different switch fabric element as the active switch fabric. The integrity manager typically issues a signal, or in some other manner indicates which switch fabric element is currently active. A control element within the integrity manager designates which switch fabric element is to be the active switching device. The control element will designate a different switch fabric element as the active switch fabric in the event that the first switching fabric exhibits any errors. A signaling element will issue indications of which switch fabric is active so that other components in a switching system can configure themselves accordingly.

In one example embodiment, the output line card comprises an egress buffer, a cell receiver, and a cell dispatch unit. The cell receiver accepts copies of an outbound cell from the plurality of switch fabric elements and selects one copy of the cell from one switch fabric element based on the signal it receives from the integrity manager indicating what switch fabric is active. The cell receiver then forwards the cell to the egress buffer. The cell dispatch unit retrieves cells from the egress buffer and dispatches the cells to external interfaces.

The output line card may further comprise a selection unit that retrieves outbound cells from the egress buffer. A reassembly unit accepts the cells from the egress buffer selected by the selection unit and resembles the cells into datagrams. The dispatching unit then conveys the datagrams to physical interface. In yet another embodiment, the output line card may further comprise a receiving unit that retrieves outbound cells from the egress buffer and stores the outbound cells in a storage element where there is at least one storage element for each datagram that must be reassembled the same time. Additional storage elements are provided for each datagram that must be concurrently reassembled for each router port that the redundant switching system serves and for each data delivery priority level supported by the switching system. The dispatching unit will then forward the cells received in a datagram storage element to a physical interface when the datagram is fully reassembled.

The present invention may further comprise an input line card comprising an ingress buffer and a cell replicator. The input line card of the present invention may further comprise an input network processor that adjusts a read pointer to the egress buffer enabling the egress buffer to resend cells. upon command.

The present invention may also comprise an output line card. The output line card comprises an egress buffer, an interface selection unit and a cell dispatch unit. The interface selection unit comprises a plurality of cell interfaces and is capable of selecting a cell stream from one of these cell is interfaces. Data cells received from a selected cell stream are directed to the egress buffer. The cell dispatch unit retrieves the cells from the egress buffer and delivers them to external interfaces.

The output line card may further comprise an output network processor capable of determining the synchronization of a cell stream selected by the cell interface unit to cells stored in the egress buffer. The output network processor can determine synchronization either by comparing the contents of the cells in the egress buffer to cells received in the cell stream for by organizing the cells in either the cell stream or the egress buffer according to a cell sequence number.

BRIEF DESCRIPTION OF THE DRAWINGS

The foregoing features, aspects, and advantages of the present invention will become better understood from the following detailed description of one embodiment of the invention with reference to the drawings, in which.

DETAILED DESCRIPTION OF THE INVENTION

Figure 1:
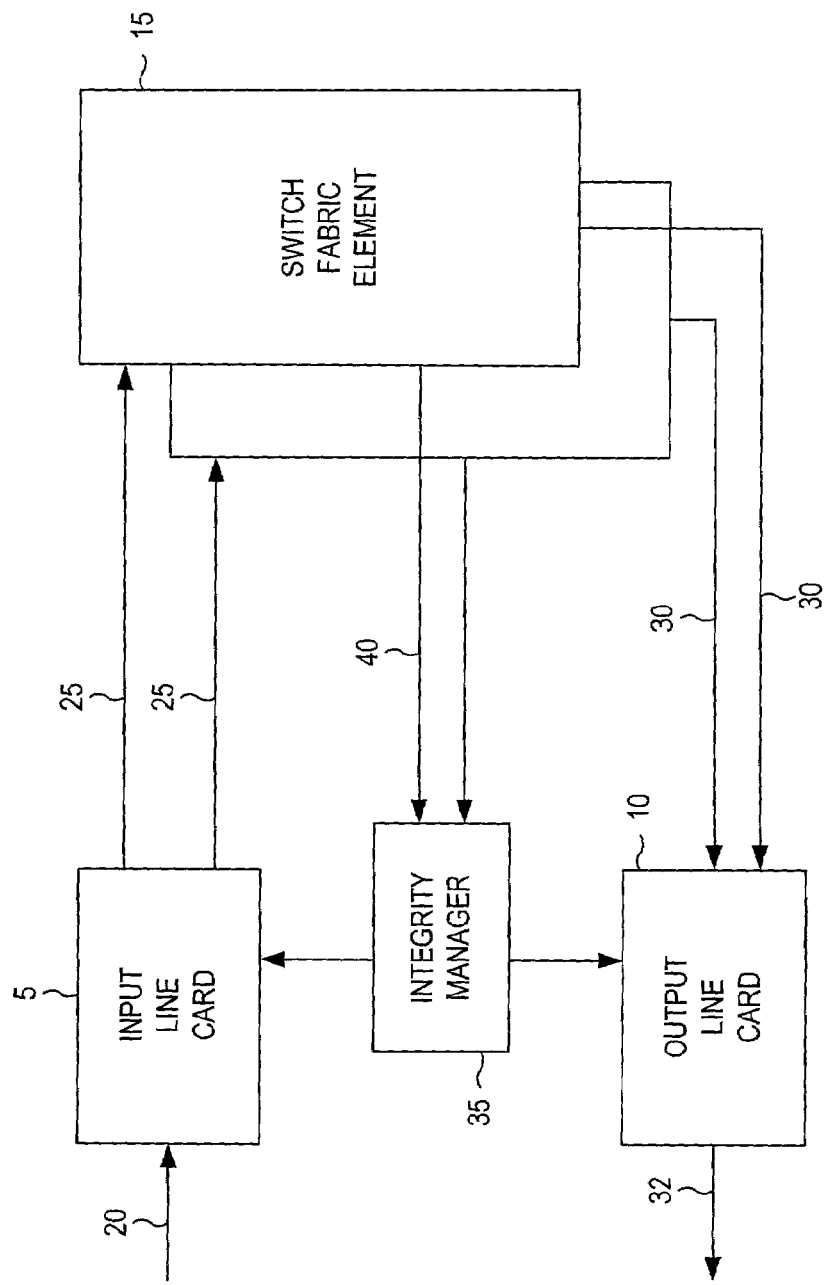
FIG. 1 is a block diagram depicting a redundant switching system according to the present invention that prevents cell loss.

FIG. 1 is a block diagram depicting a redundant switching system according to one embodiment of the present invention that prevents cell loss. A switching system according to the present invention comprises an input line card 5, an output line card 10 and a plurality of switch fabric element 15. The input line card 5 receives datagrams from external sources by means of an inbound data interface 20. The input line card 5 processes the datagrams by segmenting each datagram into one or more data cells where each data cell is of a fixed size. The actual size of the cells created by the input line card 5 can be varied according to the specific application of the switching system.

The input line card 5 has a plurality of inbound cell interfaces 25. Each cell generated by the input line card 5 is conveyed to each of the inbound cell interfaces 25. Each inbound cell interface 25 services a single switch fabric element 15. Hence, the number of inbound cell interfaces 25 should be equal to the number of switch fabric elements 25 that are included in a particular system. As the number of switch fabric elements 15 is increased in any given implementation, the overall reliability of the switching unit is improved. In the example depicted in the figure, only two inbound cell interfaces and two switch fabrics are shown. This two switch fabric example has been provided to teach the features of the present invention, however, any number of switch fabrics, input or output line cards can be integrated together to form a lossless redundant switching system according to the present invention.

Each switch fabric element 15 receives a copy of the cell sent by the input line card 5 and operates to route the cell to the appropriate output line card 10. Although not shown in FIG. 1, each switch fabric element 15 comprises an outbound cell interface 30 for each output line card 10 in a particular implementation. It should be noted that the number of input line cards and output line cards can be varied according to the number of external interfaces that each provides and the number of interfaces a particular system requires. It follows that each output line card 10 typically comprises at least one outbound cell interface 30 for each switch fabric element 15 so that cells can be received from each of the switch fabric elements 15.

The switching system according to one embodiment of the present invention further comprises an integrity manager 35. The integrity manager 35 receives health status from each of the switch fabric elements 15 using a plurality of health monitoring interfaces 40. The integrity manager 35 selects one of the plurality of switch fabric elements 15 and designates that individual switch fabric element as the "active" switching fabric. The designation of which switch fabric element 15 is the designative active element is conveyed to the input line card 5 and the output line card 10. When the integrity monitor 35 detects that the active switch fabric element 15 is inoperative or needs to become inactive for any reason, it will designate a different switch fabric elements as the active switching fabric. This re-designation event is also conveyed to the input line card 5 and the output line card 10.

The input line card 5 responds to re-designation events by preparing to resend cells that may be lost during switch-over to the new switch fabric. The output line card 10 uses the re-designation event as a trigger to select cells from the alternative switch fabric element that has been designated as the active switching fabric. Additionally, the output line card 10 will initiate cell tracking to determine if cells have been lost. If so, the output line card 10 will request the input line card 5 to retransmit the lost cells.

Figure 2:
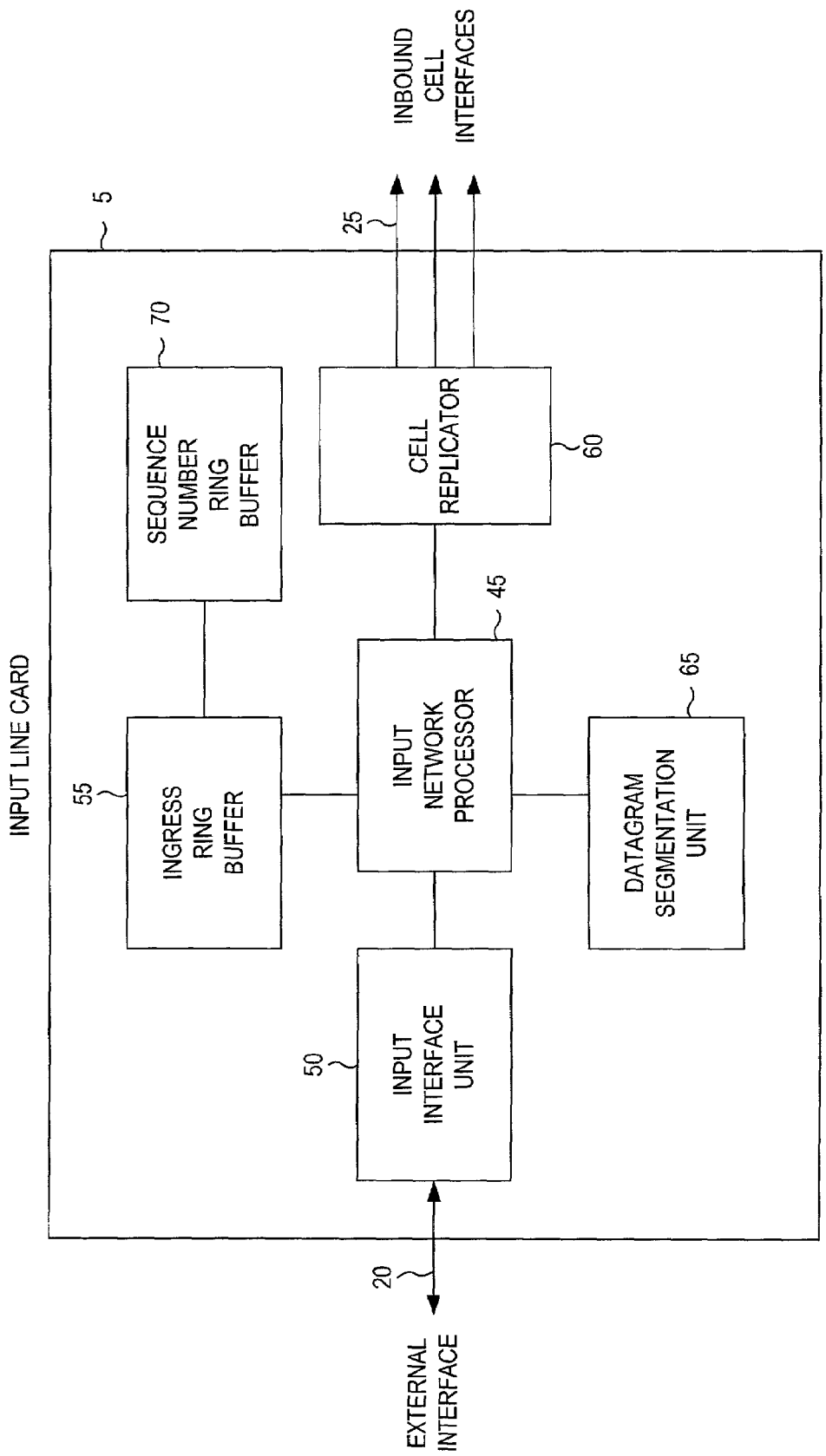
FIG. 2 is a block diagram depicting one example of an input line card.

FIG. 2 is a block diagram depicting one example of an input line card that can be used to implement one embodiment of the present invention. The input line card 5 comprises an input network processor 45, an external interface unit 50, an ingress buffer 55, and a cell replicator 60. The input line card 5 can further comprise a datagram segmentation unit 65 and may further comprise an ingress sequence number buffer 70. The input line card 5 receives datagrams via an external interface 20. The external interface 20 can comprise some form of a physical interface such as Ethernet, a T1 line or any other type of physical interface. Datagrams arriving by the external interface 70 are processed by an external interface unit 50.

The input network processor 45 receives the datagrams from the external interface unit 50 and subjects the datagrams to segmentation. A specialized processor may be used in some embodiments to assists the input network process 45 in performing the segmentation. The specialized processor can be called a datagram segmentation unit 65. It should be noted that the actual segmentation may be performed by the input network processor 45 directly or by some other device external to the input line card 5.

Datagrams arriving at the external interface 70 can be of varying length. Each datagram is segmented into one or more data cells. The cells, as described supra, are typically standardized to a fixed size but different embodiments of the present invention may utilize cells of varying size. The input network processor 45 manages each cell by placing the cell into the ingress buffer 55. In this example, the ingress buffer 55 provides a first-in-first-out (FIFO) functionality that serves as an elasticity buffer and can be managed to retransmit cells that may be lost during switch-over from an active switch fabric element to a redundant switch fabric element.

The input network processor 45 manages read and right pointers that collectively defined the head and tail of the ingress buffer 55. One novel aspect of the present invention is that the read pointer can be retarded to allow re-transmission of cells if cells are lost during switch fabric switch-over. Ordinarily, the input network processor 45 will retrieve cells from the ingress buffer 55 using the read pointer. Having so retrieved a cell, the input network processor 45 forwards the cell to the cell replicator 60. The cell replicator 60 creates a plurality of copies of the cell; each of which will be then dispatched to the plurality of switch fabric element 15 using individual inbound cell interfaces 25. Each switch fabric element then appropriately routes each cell to an output line card 10. The structure of a switch fabric element 15 comprises health-monitoring circuitry necessary to effectuate detection of failures. Each switch fabric element 15 comprises circuitry capable of detecting "hard failures" or transient data errors.

In some implementations, the ingress buffer 55 is augmented by an ingress sequence number buffer 70. In these alternative embodiments, the input network processor 45 creates a sequence number for each cell created during datagram segmentation. The sequence number for each cell is stored in the ingress sequence number buffer 70. In order to facilitate reassembly of datagrams by the output line card, the input network processor 45 can transmit the sequence number along with each cell transmitted to the switch fabric elements 15.

Figure 3:
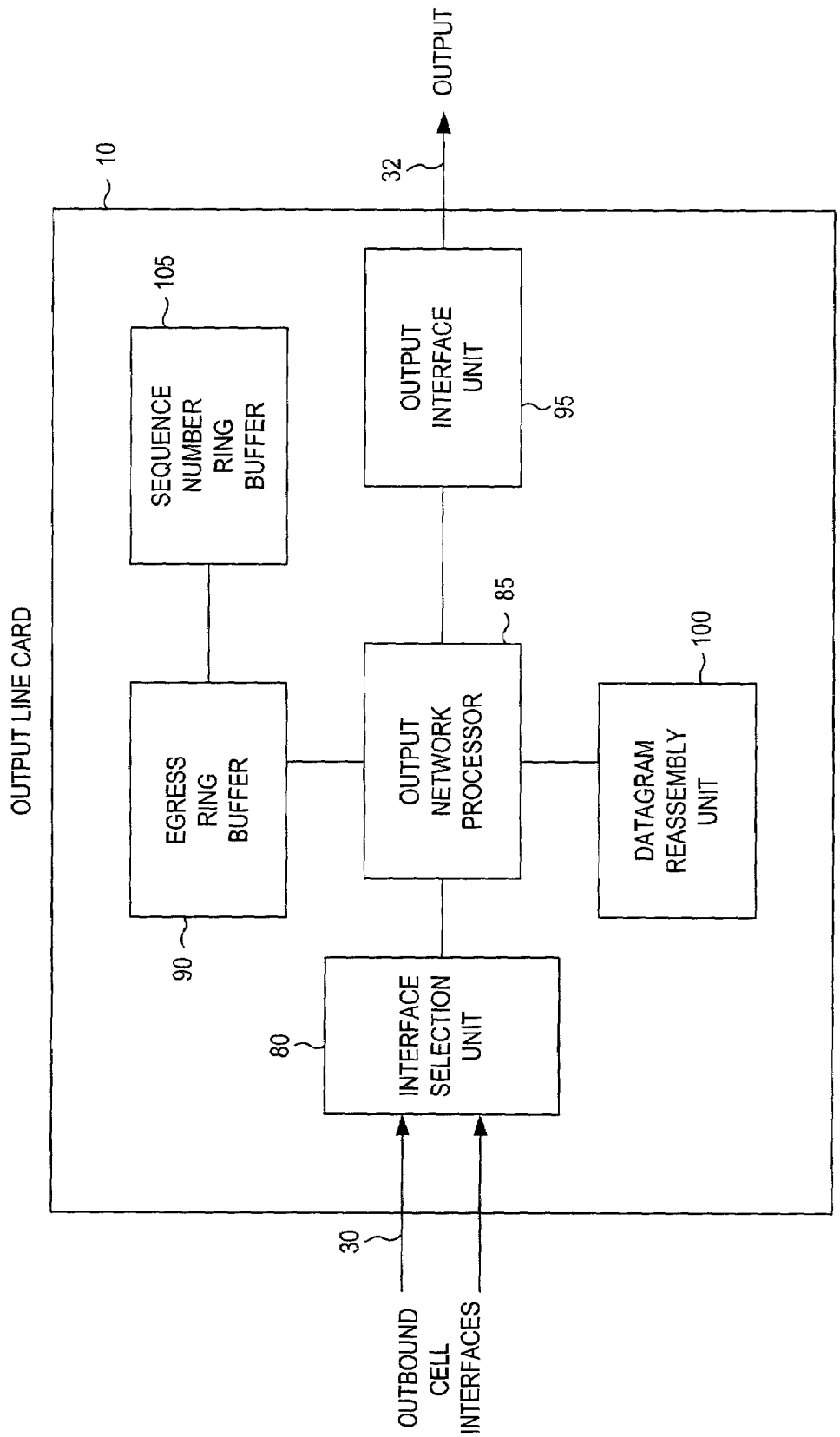
FIG. 3 is a block diagram of an output line card according to the present 15 invention.

FIG. 3 is a block diagram of an output line card 10 according to one embodiment of the present invention. The output line card 10 comprises an interface selection unit 80, an output network processor 85, an egress buffer 90 and an output interface unit 95. The output line card 10 may further comprise a datagram reassembly unit 100 and it may further comprise an egress sequence number buffer 105. The output network processor 85 receives information about the health of the switch fabric elements 15 in the switching system. Using this information, the output network processor 85 instructs the interface selection unit 80 which of a plurality of outbound cell interfaces 30 to select as the active source of outbound cells. It should be noted that each switch fabric element 15 in the switching system is typically connected to one of these outbound cell interfaces 30. As cells are received by the output network processor 85, they are stored in the egress buffer 90. In those implementations where the cells are accompanied by a sequence number, the sequence number for the cell is stored in the egress sequence number buffer 105.

When the output network processor 85 recognizes a switch fabric switch-over event, the output network processor 85 instructs the interface selection unit 80 to select the outbound cell interfaces 30 corresponding to the newly designated active switch fabric element 15. During this switch-over, cells arriving at the interface selection unit 80 are forwarded to the output network processor 85. The output network processor 85 then determines if the cells arriving from the newly designated active switch fabric element 15 are synchronized to the stream of cells already received and stored, prior to the switch-over, in the egress buffer 90. Because the switch fabric elements 15 do not operate in a micro-cycle synchronous manner, cells received from any given switch fabric element may arrive either at the same time, earlier, or later than the same cell received from any other switch fabric element.

The egress buffer 90 provides a means for resynchronizing the stream of cells received from the previously active switch fabric element with the stream of cells received from the newly designated active switch fabric element. The output network processor 85 manages this resynchronization activity. By correlating each cell received from the new active switch fabric element 15 with those cells stored in the egress buffer 90, the output network processor 85 can determine if the two cell streams are synchronized or not. If the two cell streams are in fact synchronized, the output network processor 85 continues to direct the cells to the egress buffer 90 as though no switch-over event had occurred. However, if the two cell streams are not synchronized, the output network processor 85 determines the course of action based on whether the new active cell stream leads or lags the prior active cell stream. The output network processor 85 can also use cell sequence numbers stored in the egress sequence number buffer 105. By using these sequence numbers, the output network processor 85 determines the synchronization of two cell streams in a much more efficient manner. One advantage of using the sequence numbers is that a bit-by-bit comparison of arriving cells to the cells stored in the egress buffer 90 is avoided.

In the event that the new active cell stream lags its predecessor, a gap will be formed in the egress buffer 90. In this event, the output network processor 85 requests the input line card 5 to retransmit those cells lost during the switch-over event. The output network processor 85 adjusts the write pointer into the egress buffer 90 so that the retransmitted cells can be stored in the egress buffer 90 immediately upon their arrival.

If, on the other hand, the new active stream is ahead of the old active stream of cells, an overlap is formed. In the case of an overlap, the output network processor 85 does not need to request retransmission of lost cells since no cells are lost. The output network processor 85 need only adjust the read pointer for the egress buffer 90 so as to eliminate the overlap.

Figure 4:
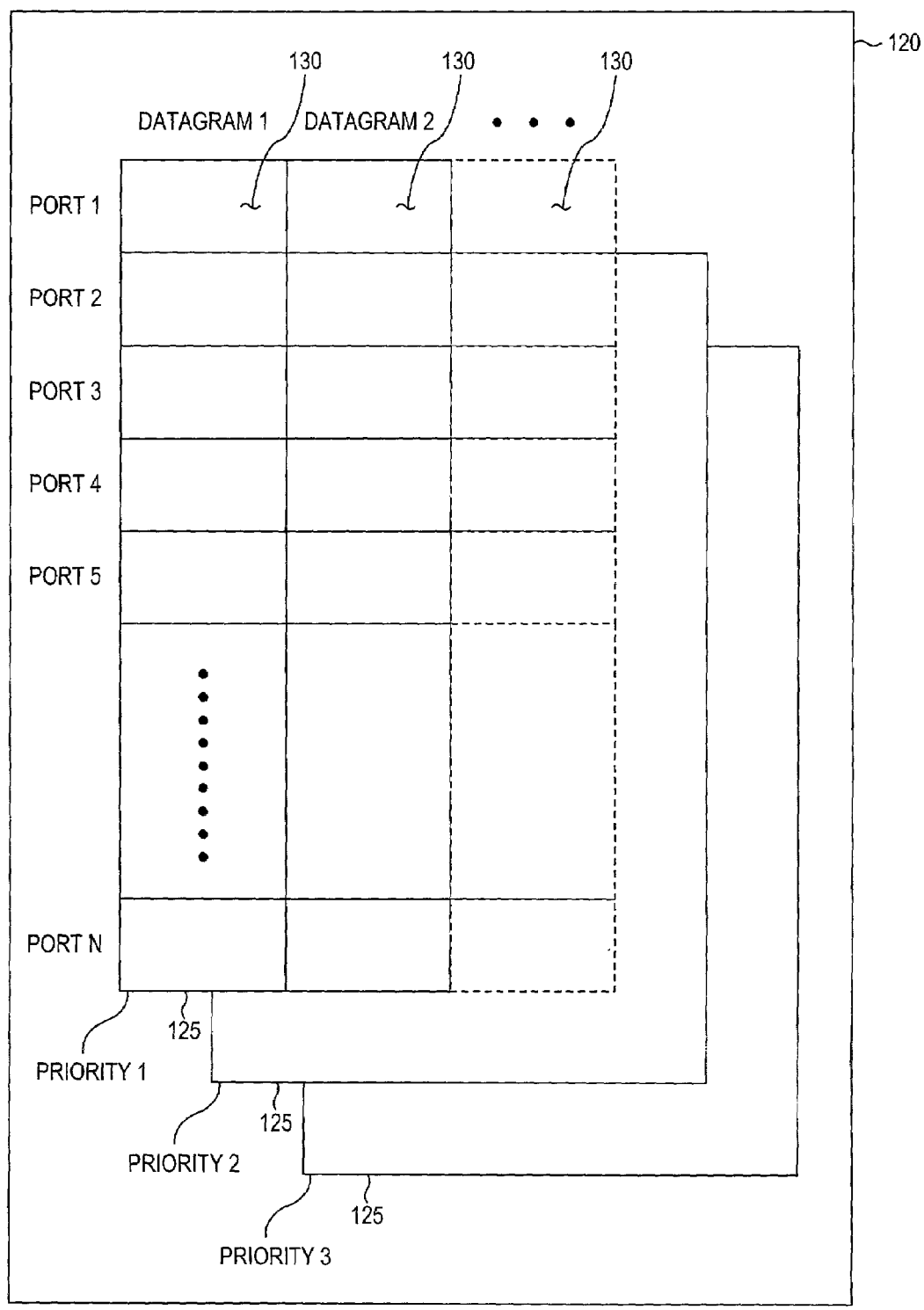
FIG. 4 is a pictorial representation of a datagram reassembly data structure.

FIG. 4 is a pictorial representation of a datagram reassembly data structure. During switchover, a cell can arrive after a cell belonging to a subsequent packet has arrived. In this illustrative example, the datagram read assembly data structure 120 comprises one or more substructures 125. These substructures are used to segregate datagrams during reconstruction according to delivery priority levels. Typically, the datagram reassembly data structure 120 will have at least two priority level substructures, i.e. "Level 1" and "Level 2". However, in other embodiments, more or fewer priority levels may be used.

Each substructure 125 itself comprises a number of buckets 130 for each output port that the output line card 10 services. As cells arrive in the egress buffer 90, they are retrieved by the output network processor 85 and used to reassemble datagrams. The output network processor 85 examines each cell and determines its priority level, the port it is bound for, and what datagram it belongs to. The number of buckets 130 provided for each output port depends on the number of datagrams that must be simultaneously reassembled. The number of datagrams that must be simultaneously reassembled is determined by the number of cells carried in the egress buffer 90. Empirical analysis is required for each particular embodiment to determine the size of both the egress buffer 90 and the ingress buffer 55. Factors that contribute to the size of both the egress buffer 90 and the ingress buffer 55 include the maximum size of a datagram that the switching system can process and the latency affiliated with switching from a first active switch fabric element to a second active switch fabric element during switch-over.

Hence, as the output network processor 85 retrieves cells from the egress buffer 90, they are directed to one of the buckets 130 for one of the output ports supported by the output line card 10 according to delivery priority. Once a datagram is completely reassembled in one of these buckets, the output network processor 85 retrieves the reassembled datagram from the bucket and directs the datagram to the output interface unit 95. The output interface unit 95 then directs the datagram to the external interface 107. The external interface 107 may be any physical interface appropriate for a particular application.

Figure 5:
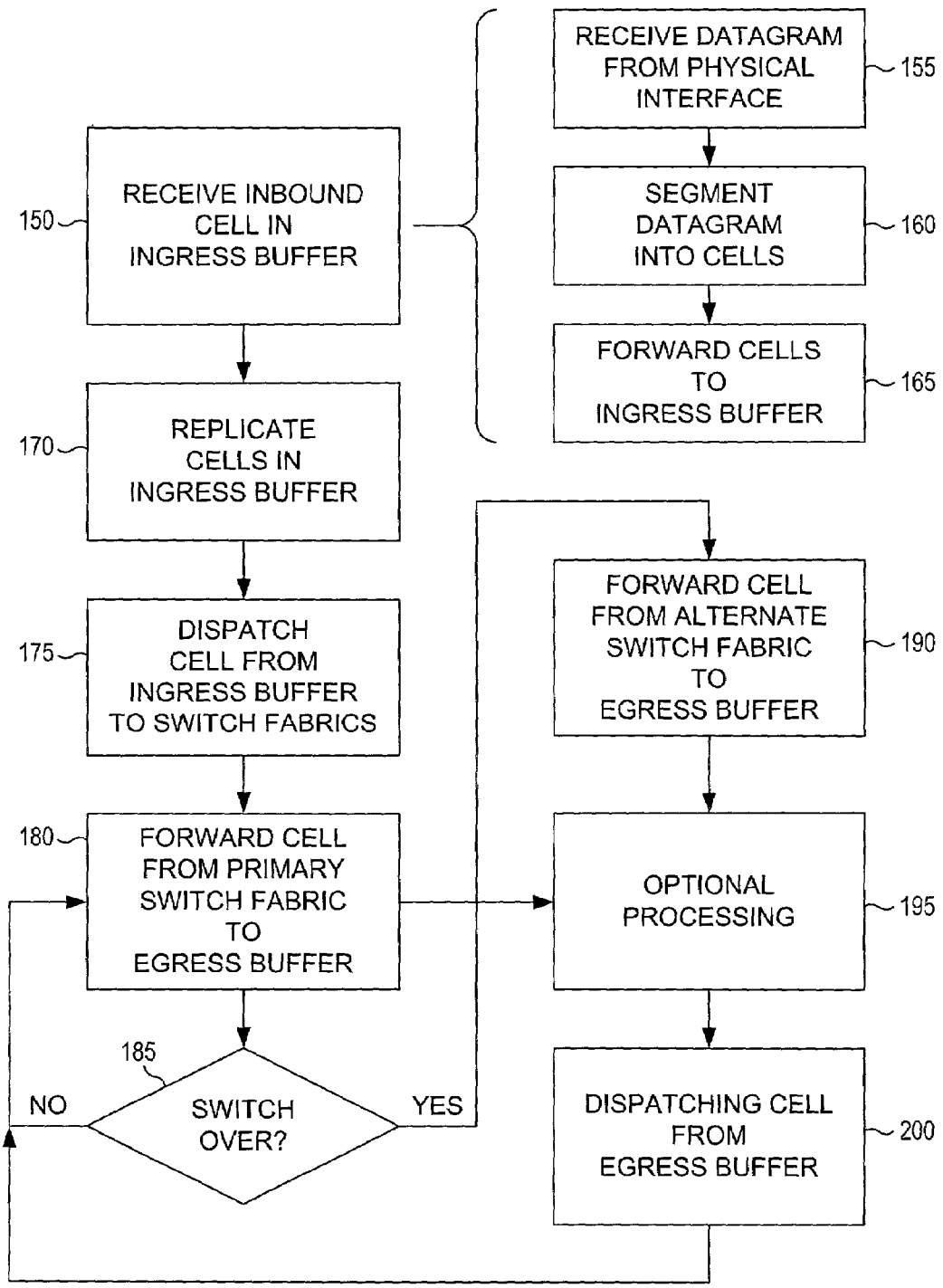
FIG. 5 is a flow diagram that depicts the method embodied in the present invention.

FIG. 5 is a flow diagram that depicts the method embodied in the present invention. Accordingly, the first step in the process is that of receiving inbound cells into an ingress buffer (step 150). This step may in fact be comprised of a series of sub-steps. These sub-steps may comprise receiving a datagram from a physical interface (step 155). An additional step may be included for segmenting a datagram into cells (step 160). Once the datagrams are segmented, they can be forwarded to the ingress buffer (step 165).

After the cells are received in the ingress buffer, they are replicated and then dispatched from the ingress buffer to a plurality of switch fabrics (steps 170 and 175). From the switch fabrics, one cell is received from a designated active switch fabric and stored in an egress buffer (step 180). If a switch-over event occurs (step 185), the method provides for selecting cells from an alternative switch fabric and then storing those cells in the egress buffer (step 190). The cells may be subject to some optional processing (step 195) such as reassembly of the cells into datagrams. Cells from the egress buffer are then dispatched to their destinations (step 200). It should be noted that where cells are reassembled into datagrams, the datagrams are dispatched in step 200 instead of cells. In step 200, dispatching cells from the egress buffer may further comprise management of the ingress and egress buffers to prevent cell loss.

Figure 6:
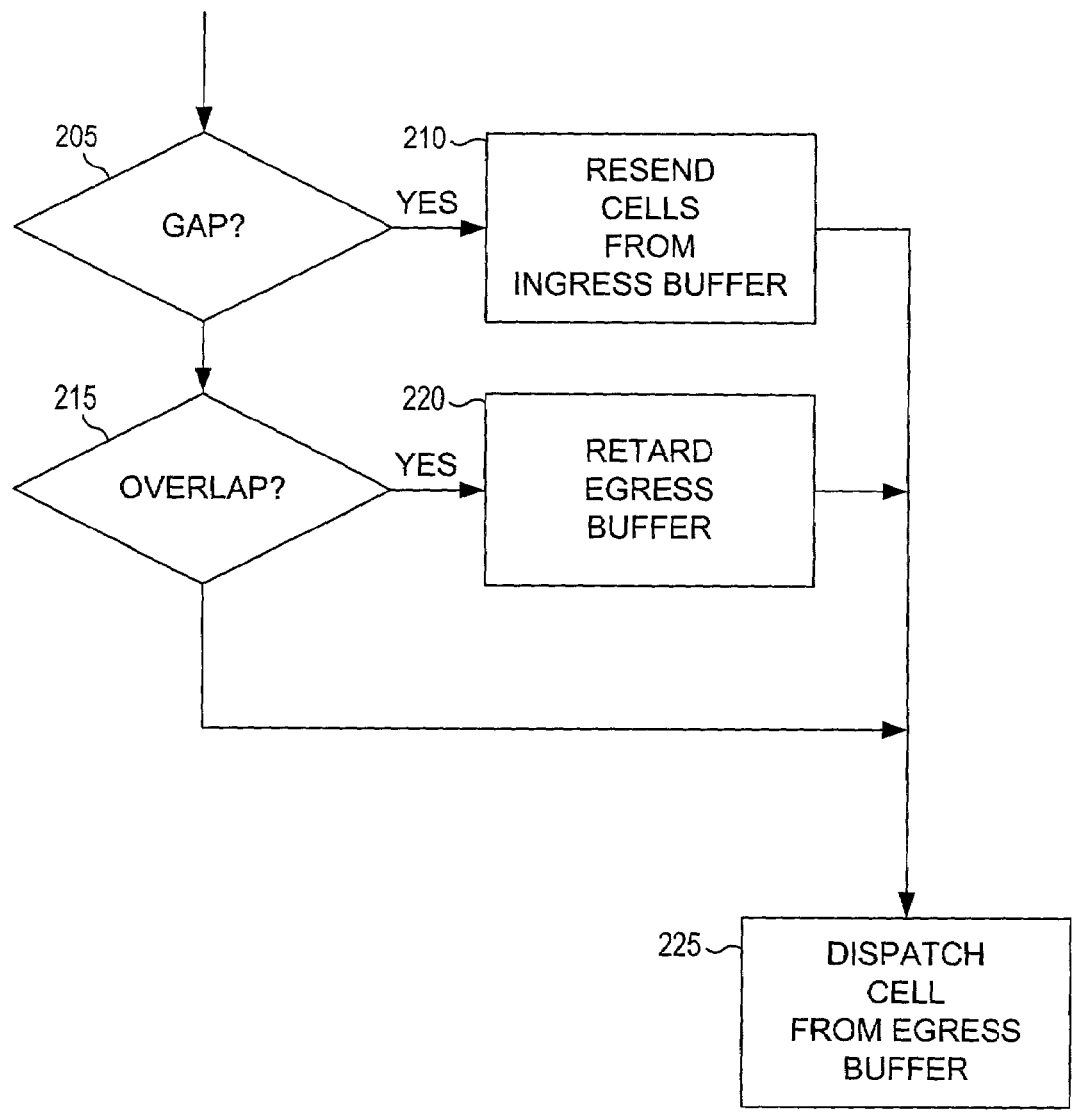
FIG. 6 is a flow diagram that depicts the process of buffer management according to one embodiment of the present invention.

FIG. 6 is a flow diagram that depicts the process of buffer management according to one embodiment of the present invention. The first thing that occurs after a switch-over event is determination if there is a gap or an overlap in the stream of cells arriving from the primary and alternate switch fabric elements. If there is a gap (step 205), cells must be resent from the ingress buffer (step 210) to prevent cell loss. These cells are then routed through the newly designated active switch fabric and stored in the egress buffer. If there is an overlap (Step 215), the egress buffer must be retarded so that the same cells are not sent twice (step 220). Once buffer management is complete, the cells are then dispatched from the egress buffer (step 225).

Alternative Embodiments

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

I claim:

1. A method for preventing cell loss during switch-over in a redundant switch fabric comprising the steps of:
   receiving an inbound cell in an ingress buffer;
   dispatching copies of said inbound cell stored in said ingress buffer to a plurality of switch fabric elements receiving said cell copies in said plurality of switch fabric elements;
   forwarding an outbound cell from a designated active switch fabric element to an egress buffer;
   receiving a redesignation of the active switch fabric element during a switch over;
   forwarding an outbound cell from the redesignated active fabric switch element to the egress buffer;
   dispatching an outbound cell from the egress buffer;
   determining whether there is a gap or an overlap in the contents of the egress buffer relative to a cell stream arriving from a newly designated active switch fabric element;
   if there is an overlap in the egress buffer, adjusting a read pointer for the egress buffer to accommodate the overlap;
   if there is a gap in the egress buffer, dispatching a cell from the ingress buffer so as to send copies of the cell to the plurality of switch fabric elements again to prevent the loss of the cell; and
   wherein the step of dispatching the outbound from the egress buffer further comprises dispatching the cell received from the egress buffer after it is adjusted for any gap or overlap.

2. The method of claim 1 wherein the step of receiving an inbound cell into an ingress buffer comprises the steps of:
   receiving a datagram from a physical interface;
   segmenting the datagram into at least one cell; and
   forwarding the cell to the ingress buffer.

3. The method of claim 2 further comprising the step of attaching a cell sequence number to said cell and then storing the sequence number in the ingress buffer.

4. The method of claim 1 wherein the step of dispatching copies of the inbound cell stored in the ingress buffer to a plurality of switch fabric elements comprises the steps of:
   selecting said inbound cell from the ingress buffer;
   replicating said cell into a plurality of copies; and
   sending said cell copies to a plurality of switch fabric elements.

5. The method of claim 1 wherein the step of determining whether there is a gap or an overlap in the contents of the egress buffer is accomplished by either comparing the contents of the cells arriving from the newly designated active switch fabric to cells stored in the egress buffer or by examining a cell sequence number attached to a cell arriving from the newly designated active switch fabric to a cell sequence number attached to a cell stored in the egress buffer.

6. The method of claim 1 wherein the step of dispatching an outbound cell from the egress buffer further comprises the steps of:
   selecting a plurality of outbound cells from the egress buffer;
   reassembling said outbound cells into a datagram; and
   conveying the datagram to a physical interface, thereby dispatching an outbound cell from the egress buffer.

7. A method for preventing cell loss during switch-over in a redundant switch fabric comprising the steps of:
   receiving an inbound cell in an ingress buffer;
   dispatching copies of said inbound cell stored in said ingress buffer to a plurality of switch fabric elements;
   receiving said cell copies in said plurality of switch fabric elements;
   forwarding an outbound cell from a designated active switch fabric element to an egress buffer;
   receiving a redesignation of the active switch fabric element during a switch over;
   forwarding an outbound cell from the redesignated active fabric switch element to the egress buffer;
   dispatching an outbound cell from the egress buffer by:
     selecting a plurality of outbound cells from the egress buffer;
     reassembling said outbound cells into a datagram; and
     conveying the datagram to a physical interface; and
   wherein the step of reassembling outbound cells into datagrams comprises the steps of:

creating a storage element for each datagram to be concurrently reassembled for each priority level for each router port to be served;

receiving an outbound cell from the egress buffer and storing said outbound cell into a storage element wherein the storage element is selected according to the datagram that it is assigned to, the priority level of the cell and the destination router port; and wherein the datagram is conveyed to the physical interface once all cells to the datagram are received in the storage element.

8. A redundant switching system comprising:

a plurality of switch fabric elements that accept inbound cells and direct those cells to output ports as outbound cells;

an input line card comprising:
   an ingress buffer;
   a cell replicator that receives inbound cells from the ingress buffer and forwards copies of said inbound cells to the plurality of switch fabric elements;

an integrity manager that monitors the health of the plurality of switch fabric elements and designates an active switch fabric element and, upon detecting an error in the active switch fabric element, designates a different switch fabric element as the active switch fabric element and issues an active switch signal that indicates what switch fabric matrix is currently active;

an output line card comprising:
   an egress buffer;
   a cell receiver that accepts outbound cells from a plurality of switch fabric elements and selects a cell from a switch fabric matrix based on the active switch signal received from the integrity manager and forwards that cell to the egress buffer; and
   a dispatch unit that retrieves cells from the egress buffer and dispatches said cells to external interfaces;
   an egress buffer content manager that:
      determines whether there is a gap or overlap in the contents of the egress buffer relative to cells arriving from a newly designated active switch fabric element;
      adjusts a read pointer for the egress buffer to accommodate the overlap if there is the overlap; and
      issues a gap detection signal when a gap is detected;
   a commanding unit that, upon receiving a gap detection signal from the egress buffer manager, requests the ingress buffer to send copies of cells corresponding to the length of the gap to the plurality of switch fabric elements again to prevent the loss of the cell copies if there is a gap in the egress buffer; and
   the dispatch unit forwarding a received cell from the egress buffer after it has been adjusted for any gap or overlap.

9. The redundant switching system of claim 8 wherein the input line card further comprises:

a physical interface that receives datagrams from external sources;

a segmentation unit that segments datagrams into cells of fixed length; and a cell manager that stores cells in the ingress buffer.

10. The redundant switching system of claim 8, wherein the input line card further comprises:

a cell sequence numbering unit that attaches a cell sequence number to a cell; and the ingress buffer storing the cell with sequence number.

11. The redundant switching system of claim 8 wherein the cell replicator of the input line card further comprises:

a cell selection unit that selects an inbound cell from the ingress buffer;

a replicating unit that replicates the inbound cell selected by the cell selection unit into a plurality of copies; and a cell dispatch unit that sends the cell copies to a plurality of switch fabric elements.

12. The redundant switching system of claim 8 wherein the output line card further comprises:

a selecting unit that selects an outbound cell from the egress buffer;

a reassembling unit that reassembles the outbound cell into a datagram; and the dispatch unit conveying the datagram to one of the external interfaces.

13. A redundant switching system comprising:

a plurality of switch fabric elements that accept inbound cells and direct those cells to output ports as outbound cells;

an input line card comprising:
   an ingress buffer;
   a cell replicator that receives inbound cells from the ingress buffer and forwards copies of said inbound cells to the plurality of switch fabric elements;

an integrity manager that monitors the health of the plurality of switch fabric elements and designates an active switch fabric element and, upon detecting an error in the active switch fabric element, designates a different switch fabric element as the active switch fabric element and issues an active switch signal that indicates what switch fabric matrix is currently active; and an output line card comprising:
   an egress buffer;
   a receiving unit that receives an outbound cell from the egress buffer;
   a cell receiver that accepts outbound cells from a plurality of switch fabric elements and selects a cell from a switch fabric matrix based on the active switch signal received from the integrity manager and forwards that cell to the egress buffer;
   a storage element for each datagram to be concurrently reassembled for each priority level for each router port to be served that stores the outbound cell wherein storage element is selected according to the datagram that it is assigned to, the priority level of the cell and the destination router port; and
   a dispatching unit that forwards all cells to the datagram received in the storage element to a physical interface.

* * * * *